US012800863B2

(12) United States Patent
Ohno et al.

(10) Patent No.: US 12,800,863 B2
(45) Date of Patent: Nov. 17, 2026

(54) OPTICAL CABLE, OPTICAL CABLE STRUCTURE, AND METHOD FOR MANUFACTURING OPTICAL CABLE

(71) Applicant: Fujikura Ltd., Tokyo (JP)

(72) Inventors: Masatoshi Ohno, Sakura (JP); Akira Namazue, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 362 days.

(21) Appl. No.: 18/709,020

(22) PCT Filed: Nov. 8, 2022

(86) PCT No.: PCT/JP2022/041595
§ 371 (c)(1),
(2) Date: May 9, 2024

(87) PCT Pub. No.: WO2023/100604
PCT Pub. Date: Jun. 8, 2023

(65) Prior Publication Data

US 2025/0004236 A1 Jan. 2, 2025

(30) Foreign Application Priority Data

Dec. 1, 2021 (JP) ................................ 2021-195357

(51) Int. Cl.
*G02B 6/44* (2006.01)

(52) U.S. Cl.
CPC ........... *G02B 6/449* (2013.01); *G02B 6/4429* (2013.01)

(58) Field of Classification Search
CPC .. G02B 6/4413; G02B 6/4414; G02B 6/4429; G02B 6/4434; G02B 6/449
(Continued)

(56) References Cited

U.S. PATENT DOCUMENTS

| | | | | |
|---|---|---|---|---|
| 4,009,932 A * | 3/1977 | Ferrentino ........... | G02B 6/4402 385/102 |
| 4,153,332 A * | 5/1979 | Longoni ............. | G02B 6/4486 385/113 |

(Continued)

FOREIGN PATENT DOCUMENTS

| | | |
|---|---|---|
| CN | 103744152 A | 4/2014 |
| CN | 106716210 A | 5/2017 |

(Continued)

OTHER PUBLICATIONS

International Search Report issued in corresponding International Application No. PCT/JP2022/041595, dated Jan. 10, 2023, with translation (8 pages).

*Primary Examiner* — Robert Tavlykaev

(74) *Attorney, Agent, or Firm* — Osha Bergman Watanabe & Burton LLP

(57) ABSTRACT

An optical cable includes one or more tension members, optical fibers disposed around an outer periphery of the one or more tension members, and an outer sheath housing the one or more tension members and the optical fibers. A boundary elongation of the one or more tension members is smaller than a boundary elongation of the optical fibers. The boundary elongation of the one or more tension members and the boundary elongation of the optical fibers is a cable elongation corresponding to a boundary between an initial elongation region and an elastic region.

10 Claims, 7 Drawing Sheets

(PRESENT EMBODIMENT)

(58) Field of Classification Search
USPC .................................. 385/103, 104, 111–113
See application file for complete search history.

(56) References Cited

U.S. PATENT DOCUMENTS

| | | | | | |
|---|---|---|---|---|---|
| 4,966,434 | A * | 10/1990 | Yonechi | G02B 6/4434 | 385/103 |
| 5,838,864 | A * | 11/1998 | Patel | G02B 6/4433 | 385/113 |
| 10,393,977 | B2 | 8/2019 | Guenter et al. | | |
| 2006/0198585 | A1 * | 9/2006 | Keller | G02B 6/441 | 385/100 |
| 2015/0293324 | A1 * | 10/2015 | Hudson, II | G02B 6/4413 | 385/103 |
| 2015/0370026 | A1 * | 12/2015 | Hudson, II | G02B 6/4429 | 385/113 |
| 2021/0132315 | A1 | 5/2021 | Emmerich et al. | | |

FOREIGN PATENT DOCUMENTS

| | | | |
|---|---|---|---|
| CN | 107422435 | A | 12/2017 |
| JP | S52-003654 | Y1 | 1/1977 |
| JP | S60-045212 | A | 3/1985 |
| JP | H04-181905 | A | 6/1992 |
| JP | H08-286084 | A | 11/1996 |
| JP | H11-344652 | A | 12/1999 |
| JP | 2000098196 | A | 4/2000 |
| JP | 2001291429 | A | 10/2001 |
| JP | 4619424 | B2 | 1/2011 |
| JP | 4902580 | B2 | 3/2012 |
| JP | 2017058593 | A | 3/2017 |
| JP | 2022098196 | A | 7/2022 |
| TW | 202131040 | A | 8/2021 |

* cited by examiner

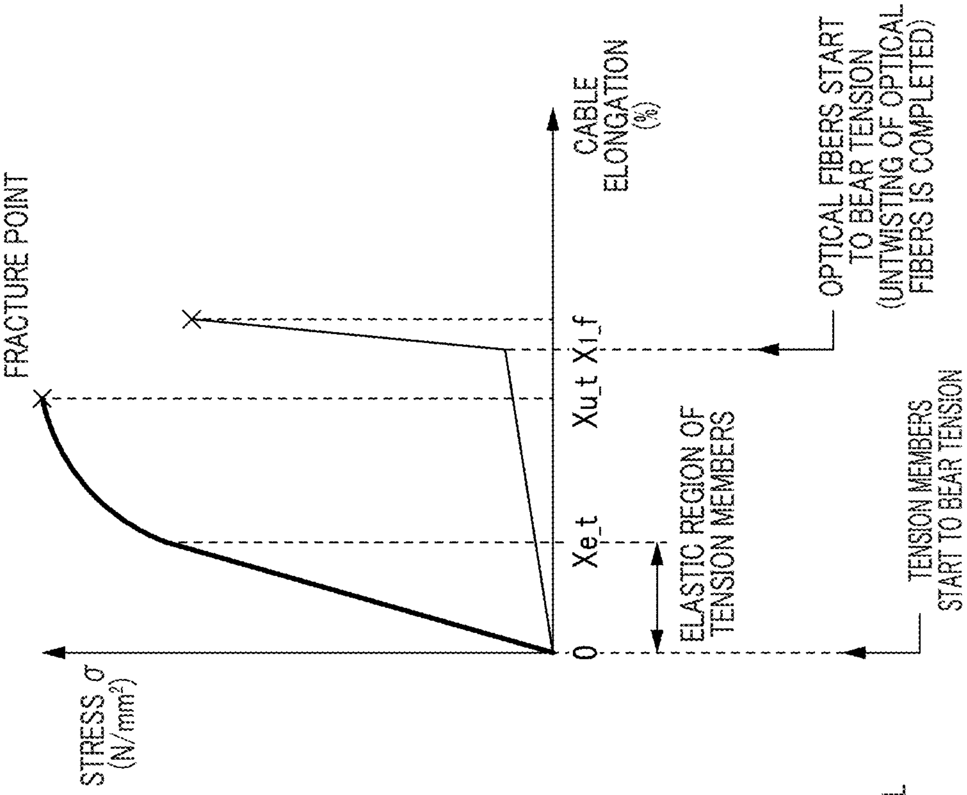
FIG. 3B (COMPARATIVE EXAMPLE)
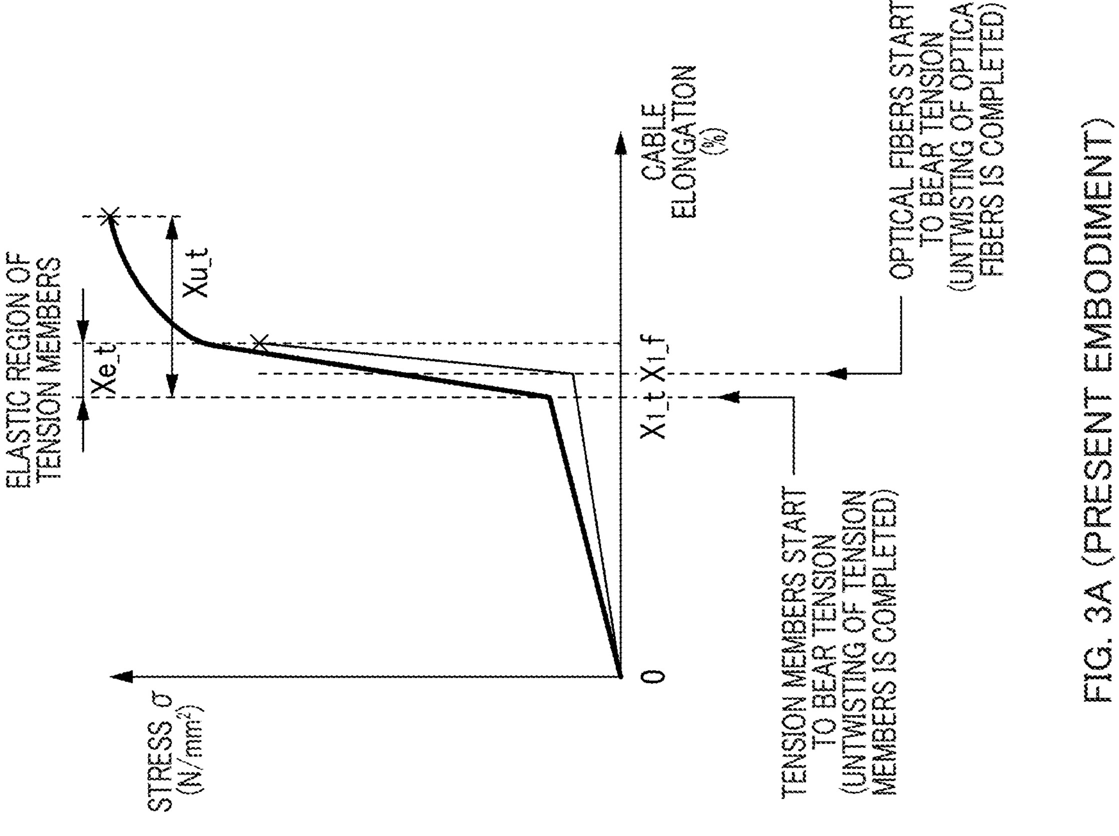
FIG. 3A (PRESENT EMBODIMENT)

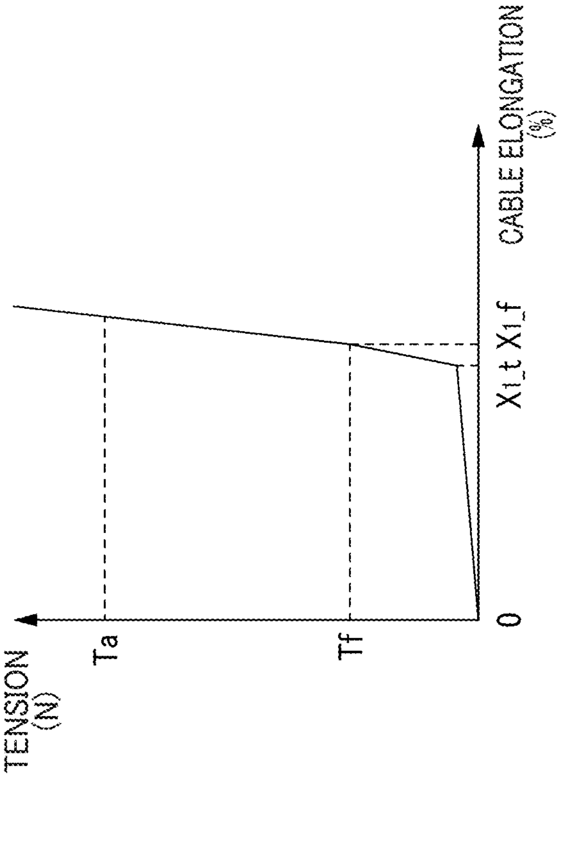
FIG. 4A (PRESENT EMBODIMENT)
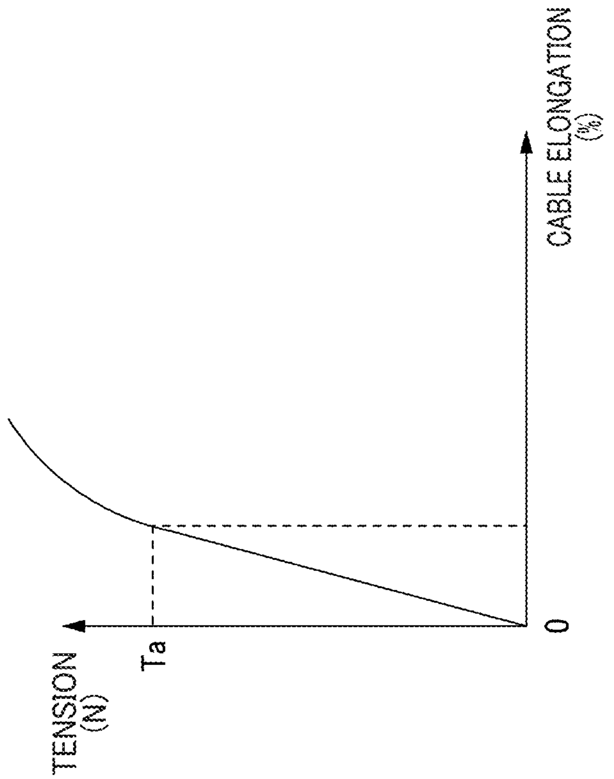
FIG. 4B (COMPARATIVE EXAMPLE)

(FIRST MODIFIED EXAMPLE)

(SECOND MODIFIED EXAMPLE)

(THIRD MODIFIED EXAMPLE)

(FOURTH MODIFIED EXAMPLE)

OPTICAL CABLE, OPTICAL CABLE STRUCTURE, AND METHOD FOR MANUFACTURING OPTICAL CABLE

CROSS-REFERENCE TO RELATED APPLICATIONS

The present application is a national phase application of International Application No. PCT/JP2022/041595, filed Nov. 8, 2022, which claims priority to Japanese Patent Application No. 2021-195357, filed Dec. 1, 2021. The contents of these applications are incorporated herein by reference in their entirety.

BACKGROUND

Technical Field

The present invention relates to an optical cable, an optical cable structure, and a method for manufacturing an optical cable.

Discussion of the Background

PTL 1 discloses an optical cable wherein tension members are disposed in the center of the optical cable.

PATENT LITERATURE

PTL 1: Japanese Patent Publication No. 2000-98196

In a structure wherein tension members are disposed in a straight manner along the cable length direction as in the optical cable of PTL 1, tension applied to the optical cable is likely to concentrate on the tension members. As a result, there is a need to provide thick tension members, which will make the optical cable thick.

SUMMARY

One or more embodiments provide a structure in which tension applied to an optical cable is easily dispersed also to members other than the tension members.

An optical cable according to one or more embodiments includes: a tension member; a plurality of optical fibers disposed around an outer periphery of the tension member; and an outer sheath housing the tension member and the plurality of optical fibers, wherein a boundary elongation of the tension member is smaller than a boundary elongation of the optical fiber, where the boundary elongation is a cable elongation corresponding to a boundary between an initial elongation region and an elastic region, the initial elongation region is a range of the cable elongation wherein, in case where the cable elongation occurs due to application of tension, a member, which is the tension member or the optical fiber, undergoes initial elongation due to the member deforming so as to approach a straight form along a cable length direction, and the elastic region is a range of the cable elongation wherein, in case where further cable elongation occurs beyond the initial elongation region, the member undergoes elastic elongation corresponding to an elastic modulus of the member.

For example, in the one or more tension members, the initial elongation region is a range of the cable elongation caused by tension generated from an initial elongation of the one or more tension members deforming to approach a straight form along a cable length direction and the elastic region is a range of the cable elongation when further cable elongation beyond the initial elongation region causes elastic elongation of the one or more tension members corresponding to an elastic modulus of the one or more tension members. In the optical fibers, the initial elongation region is a range of the cable elongation caused by tension generated from an initial elongation of the optical fibers deforming to approach a straight form along the cable length direction and the elastic region is a range of the cable elongation when further cable elongation beyond the initial elongation region causes elastic elongation of the optical fibers corresponding to an elastic modulus of the optical fibers.

An optical cable manufacturing method according to one or more embodiments involves: supplying a tension member; disposing a plurality of optical fibers around an outer periphery of the tension member; and forming an outer sheath in a manner that the tension member and the plurality of optical fibers are housed therein, wherein a boundary elongation of the tension member is smaller than a boundary elongation of the optical fiber, where the boundary elongation is a cable elongation corresponding to a boundary between an initial elongation region and an elastic region, the initial elongation region is a range of the cable elongation wherein, in case where the cable elongation occurs due to application of tension, a member, which is the tension member or the optical fiber, undergoes initial elongation due to the member deforming so as to approach a straight form along a cable length direction, and the elastic region is a range of the cable elongation wherein, in case where further cable elongation occurs beyond the initial elongation region, the member undergoes elastic elongation corresponding to an elastic modulus of the member.

Other features of one or more embodiments are disclosed in the following description of the present Specification and Drawings.

One or more embodiments can easily disperse tension applied to an optical cable also to members other than tension members.

BRIEF DESCRIPTION OF THE DRAWINGS

FIG. 3A is a conceptual diagram showing relationships between cable elongation of the optical cable according to one or more embodiments and stress on various members.

FIG. 3B is a conceptual diagram showing relationships between cable elongation of an optical cable according to a comparative example and stress on various members.

FIG. 4A is a conceptual diagram showing a relationship between cable elongation of the optical cable according to one or more embodiments and tension applied to the optical cable.

FIG. 4B is a conceptual diagram showing a relationship between cable elongation of the optical cable according to the comparative example and tension applied to the optical cable.

DESCRIPTION OF THE EMBODIMENTS

Figure 1:
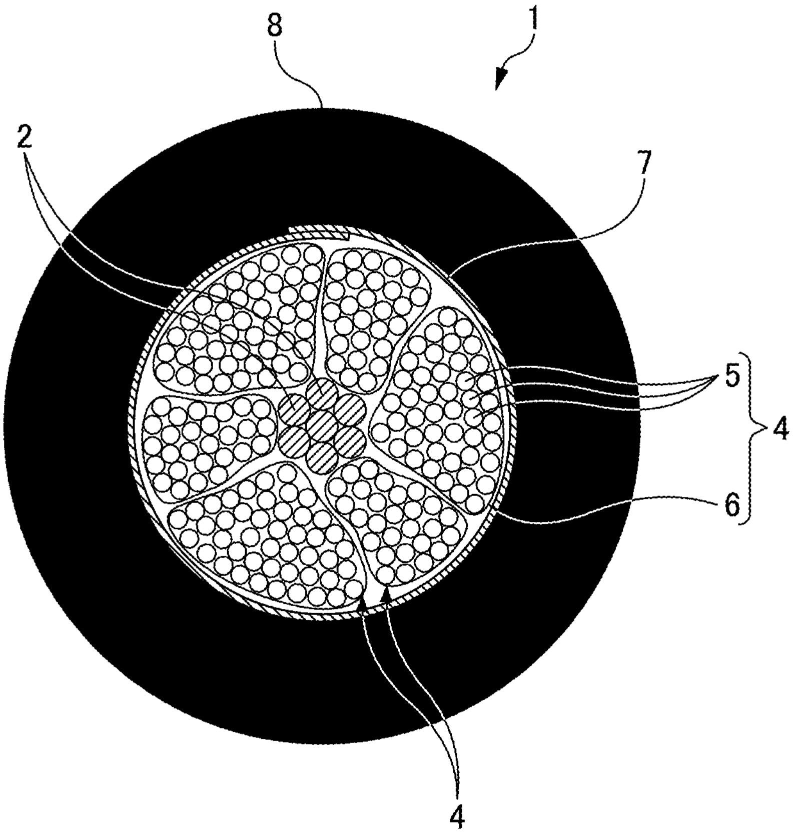
FIG. 1 is a cross-sectional view of an optical cable according to one or more embodiments.

At least the following aspects are disclosed in the Specification and Drawings as described below.

An optical cable according to a first aspect of one or more embodiments includes: a tension member; a plurality of optical fibers disposed around an outer periphery of the tension member; and an outer sheath housing the tension member and the plurality of optical fibers, wherein a boundary elongation of the tension member is smaller than a boundary elongation of the optical fiber. The boundary elongation is a cable elongation corresponding to a boundary between an initial elongation region and an elastic region. The initial elongation region is a range of the cable elongation wherein, in case where the cable elongation occurs due to application of tension, a member, which is the tension member or the optical fiber, undergoes initial elongation due to the member deforming so as to approach a straight form along a cable length direction. The elastic region is a range of the cable elongation wherein, in case where further cable elongation occurs beyond the initial elongation region, the member undergoes elastic elongation corresponding to an elastic modulus of the member. With this optical cable, tension applied to the optical cable can be easily dispersed also to members other than the tension member.

An optical cable according to a second aspect of one or more embodiments is an optical cable of the aforementioned first aspect, wherein a plurality of the tension members are twisted in an S-Z configuration. In this way, when tension is applied to the tension members, the tension members can easily elongate in the cable length direction, and as a result, tension applied to the optical cable can be easily dispersed also to members other than the tension members.

An optical cable according to a third aspect of one or more embodiments is an optical cable of the aforementioned second aspect, wherein the optical fibers are twisted in an S-Z configuration, and a twisting direction of the tension members is opposite from a twisting direction of the optical fibers. In this way, the optical cable can be inhibited from deforming in an undulating manner.

An optical cable according to a fourth aspect of one or more embodiments is an optical cable of any one of the aforementioned first to third aspects, wherein the tension members in a twisted state are disposed meanderingly. In this way, when tension is applied to the tension members, the tension members can easily elongate in the cable length direction, and as a result, tension applied to the optical cable can be easily dispersed also to members other than the tension members.

An optical cable according to a fifth aspect of one or more embodiments is an optical cable of the aforementioned fourth aspect, wherein the tension members are constituted by tensile fibers. In this way, the mutually twisted tension members can easily be disposed in a meandering manner.

An optical cable according to a sixth aspect of one or more embodiments is an optical cable of any one of the aforementioned first to fifth aspects, wherein X1_f is within a range from X1_t to X1_t+Xu_t, where X1_t (%) is the boundary elongation of the tension member, X1_f (%) is the boundary elongation of the optical fiber, and Xu_t (%) is an elongation strain of the tension member at break of the tension member. In this way, breakage of the tension members can be inhibited.

An optical cable according to a seventh aspect of one or more embodiments is an optical cable of the aforementioned sixth aspect, wherein X1_f is within a range from X1_t to X1_t+Xe_t, where Xe_t (%) is an elongation strain by which the tension member is elastically deformable. In this way, plastic deformation of the tension members can be inhibited.

An optical cable according to an eighth aspect of one or embodiments is an optical cable of any one of the more aforementioned first to seventh aspects, wherein an elongation strain of the optical fiber is 60% or less of a proof level, when an allowable tension is applied to the optical cable and thereby tension is applied to the optical fiber. In this way, reliability can be improved.

An optical cable according to a ninth aspect of one or more embodiments is an optical cable of any one of the aforementioned first to eighth aspects, wherein another tension member is embedded in the outer sheath (the optical cable includes two or more of the tension members, one of which is embedded in the outer sheath). In this case, the diameter of the tension member embedded in the outer sheath can be reduced compared to cases where tension on the optical cable is borne only by the tension member embedded in the outer sheath, and as a result, the diameter of the cable can be reduced.

An optical cable structure according to a tenth aspect of one or more embodiments includes, as inner cables, a plurality of the optical cables of any one of the aforementioned first to ninth aspects. With this optical cable structure, tension applied to the inner cables (the optical cables) can be easily dispersed also to members other than the tension members.

An optical cable manufacturing method according to an eleventh aspect of one or more embodiments is an optical cable manufacturing method involving: supplying a tension member; disposing a plurality of optical fibers around an outer periphery of the tension member; and forming an outer sheath in a manner that the tension member and the plurality of optical fibers are housed therein, wherein a boundary elongation of the tension member is smaller than a boundary elongation of the optical fiber. The boundary elongation is a cable elongation corresponding to a boundary between an initial elongation region and an elastic region. The initial elongation region is a range of the cable elongation wherein, in case where the cable elongation occurs due to application of tension, a member, which is the tension member or the optical fiber, undergoes initial elongation due to the member deforming so as to approach a straight form along a cable length direction. The elastic region is a range of the cable elongation wherein, in case where further cable elongation occurs beyond the initial elongation region, the member undergoes elastic elongation corresponding to an elastic modulus of the member. With this manufacturing method, it is possible to manufacture an optical cable in which tension can be easily dispersed also to members other than the tension member.

An optical cable manufacturing method according to a twelfth aspect of one or more embodiments is an optical cable manufacturing method of the aforementioned eleventh aspect, wherein a plurality of the tension members are twisted together, and the plurality of tension members in a twisted state are caused to meander as a result of the outer sheath shrinking in the cable length direction after being extrusion molded (the optical cable manufacturing method further includes twisting two or more of the tension members together and meandering the twisted tension members due to the outer sheath shrinking in the cable length direction after being extrusion molded). In this way, the tension members in a twisted state can be housed inside the outer sheath in a meandering manner so that, when tension is applied to the tension members, the tension members can easily elongate in the cable length direction.

First Example

{Basic Configuration of Optical Cable}

FIG. 1 is a cross-sectional view of an example of an optical cable 1 according to one or more embodiments.

In the following description, the length direction of the optical cable 1 is referred to as "cable length direction". The cross section of the optical cable 1 illustrated in FIG. 1 is a plane perpendicular to the cable length direction. In the cross section illustrated in FIG. 1, a direction around the center axis of the optical cable 1 is referred to as "circumferential direction", and a direction intersecting with the center axis of the optical cable 1 is referred to as "radial direction".

The optical cable 1 is a cable housing optical fibers 5. The optical cable 1 is a central tube-type optical cable having a slotless structure. The optical cable 1 includes tension members 2, a plurality of optical fibers 5, and an outer sheath 8.

The tension member 2 is a member for reinforcing the tensile strength of the optical cable 1. The tension member 2 has a relatively high strength (high modulus of longitudinal elasticity; high Young's modulus) with respect to tension (tensile force). For example, the tension members 2 are retained by a connector mounted to an end part of the optical cable 1, and thereby, the tension members 2 bear the tension applied to the optical cable 1.

The tension members 2 function to reduce the tension applied to the optical fibers 5. As a result of the tension members 2 reducing the tension applied to the optical fibers 5, it is possible to inhibit damage to the optical fibers 5 and an increase in transmission loss.

The tension members 2 are constituted by tensile fibers. The tensile fibers may be constituted by, for example, aramid fibers, polyethylene fibers, glass fibers, etc. By constituting the tension members 2 by tensile fibers, the tension members 2 can be provided with a high modulus of longitudinal elasticity (high Young's modulus) as well as flexibility (easily bendable properties). By providing the tension members 2 with flexibility, the tension members 2 can be made to easily meander, as will be described further below. Herein, the tension members 2 are constituted by Kevlar (registered trademark) which is an aramid fiber. Note, however, that the tension members 2 may be constituted by other members, as long as they have high tensile strength and flexibility, and may, for example, be constituted by glass yarns. Further, the tension members 2 do not necessarily have to be constituted by tensile fibers. Note, however, that in cases where the tension members 2 are caused to meander as described below, it is effective to constitute the tension members 2 by tensile fibers.

As illustrated in FIG. 1, the tension members 2 are disposed in a central part of the optical cable 1 (inside a housing space of the optical cable 1). By adopting a structure wherein the tension members 2 are disposed in a central part of the optical cable 1, it is possible to suppress bending directivity of the optical cable 1. That is, it is possible to reduce the difference between force necessary to bend the optical cable 1 in an easily-bendable direction and force necessary to bend the optical cable in a hard-to-bend direction, thus enabling the optical cable 1 to be bent with substantially equal force in all directions. Note that the tension members 2 do not have to be disposed in a central part of the optical cable 1.

Further, the tension members 2 are disposed in a twisted state. Herein, the plurality of tension members 2, which are constituted by tensile fibers, are twisted with one another. By reversing twisting directions, the tension members 2 are twisted in an S-Z configuration. By constituting the tension members 2 by members having flexibility, the tension members 2 twisted in an S-Z configuration can be disposed stably. Note that the tension members 2 may be twisted spirally in one direction. Twisting of the tension members 2 will be described further below.

The plurality of optical fibers 5 are disposed around the outer periphery of the tension members 2. More specifically, in cases where the tension members 2 are disposed in a central part of the optical cable 1, the optical fibers 5 are disposed on the radially outer side of the tension members 2, and the plurality of optical fibers 5 are disposed so as to surround the radially outer side of the tension members 2. Herein, the plurality of optical fibers 5 are constituted by a plurality of (herein, six) optical fiber units 4. An optical fiber unit 4 is a member made by bundling a plurality of optical fibers with a string-shaped bundling member 6. The optical fiber unit 4 is constituted by bundling one or a plurality of intermittently-connected optical fiber ribbons with a bundling member 6. Note that the optical fiber unit 4 may be constituted by bundling a plurality of single optical fibers 5 with a bundling member 6. The bundling member 6 is not limited to a string-shaped member, and may be, for example, a tube-shaped member. Further, a plurality of optical fibers 5 which are not bundled by a bundling member 6 may be disposed around the outer periphery of the tension members 2. By disposing the plurality of optical fibers 5 around the outer periphery of the tension members 2, it is possible to achieve a structure wherein the tension members 2 can be easily disposed, for example, in the central part of the cable (thus making it easy to suppress bending directivity of the optical cable 1). Furthermore, by disposing the plurality of optical fibers 5 around the outer periphery of the tension members 2, later-described structural room for elongation (slack) in the length direction can be maintained easily.

The plurality of optical fibers 5 are disposed in a twisted state. By twisting the plurality of optical fibers 5, it is possible to inhibit reduction in transmission loss in specific optical fibers 5 when the optical cable 1 is bent. For example, the optical fibers 5 may be twisted in one direction, or may be twisted in an S-Z configuration by reversing twisting directions. Twisting the optical fibers 5 in an S-Z configuration makes it easier to take out the optical fibers 5 from the optical cable 1, compared to cases where the optical fibers 5 are twisted spirally in one direction. Note that, since the plurality of optical fibers 5 are disposed in a twisted state around the outer periphery of the tension members 2, the excessive length of the optical fibers 5 can easily be made longer than the excessive length of the tension members 2.

The twisting direction of the tension members 2 may be in the opposite direction from the twisting direction of the optical fibers 5. For example, in the cross-sectional view of FIG. 1, in cases where the tension members 2 are twisted in the clockwise direction toward the near side of the drawing, the optical fibers 5 may be twisted in the counterclockwise direction toward the near side of the drawing. By making the twisting directions of the tension members 2 and the optical fibers 5 opposite from one another in this way, the optical cable 1 can be inhibited from deforming in an undulating manner.

The outer sheath 8 is a member for housing the tension members 2 and the plurality of optical fibers 5. The outer sheath 8 is formed in a hollow shape when viewing its cross section (in this example, the cross section is formed in a tubular shape), and a housing space is formed in the interior. Note that, although the outer shape of the outer sheath 8 is substantially circular in this example, the outer shape of the outer sheath 8 is not limited to circular, and may have a different shape, such as rectangular, elliptic, etc. The outer sheath 8 may be constituted, for example, by a polyolefin (PO) resin such as polyethylene (PE), polypropylene (PP), ethylene-ethyl acrylate copolymer (EEA), ethylene-vinyl acetate copolymer (EVA), ethylene-propylene copolymer (EP), etc., or other resin such as polyvinyl chloride (PVC), etc. The outer sheath 8 is molded by subjecting a molten resin to extrusion molding, as will be described further below.

In the optical cable 1 illustrated in FIG. 1, a core constituted by the tension members 2 and the plurality of optical fibers 5 is housed inside the outer sheath 8 in a state where it is wrapped by a wrapping tape 7. By wrapping the optical fibers 5 with the wrapping tape 7, the optical fibers 5 can be prevented from getting buried in the outer sheath 8 at the time of molding the outer sheath 8 with molten resin. Note, however, that the wrapping tape 7 does not have to be disposed inside the outer sheath 8. Further, the optical cable 1 may include other members. For example, the optical cable 1 may include a rip cord (not illustrated in FIG. 1) for tearing open the outer sheath 8, or an intervening member (not illustrated in FIG. 1) which fills up the space inside the optical cable 1.

{Initial Elongation Region, Elastic Region, and Boundary Elongation}

Figure 2:
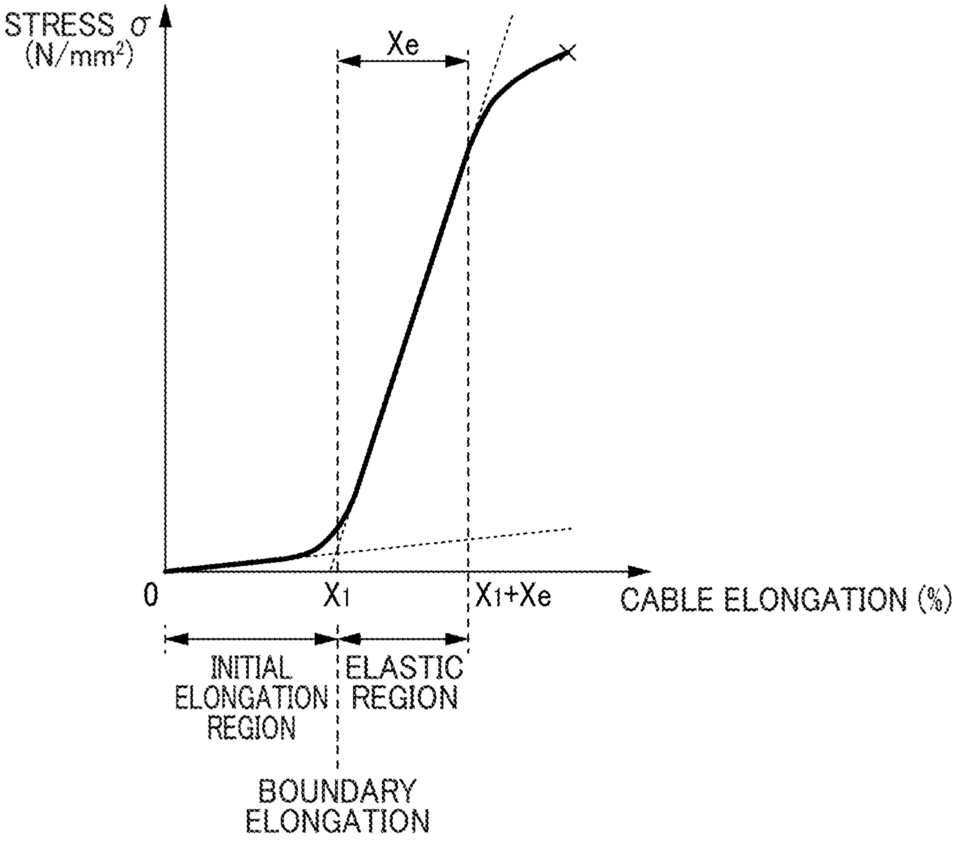
FIG. 2 is a conceptual diagram showing a relationship between elongation of the optical cable (cable elongation) and stress on a member housed inside the optical cable.

FIG. 2 is a conceptual diagram showing a relationship between elongation of the optical cable 1 (cable elongation) and stress on a member (e.g., the tension member 2 and/or the optical fiber 5) housed inside the optical cable 1. In the following description, elongation of the optical cable 1 in the cable length direction caused by application of tension, or the amount of elongation, may be referred to as "cable elongation". The horizontal axis in the graph indicates cable elongation (unit: %), which, herein, indicates the rate of the length of elongation of the optical cable 1 to the original length of the optical cable 1 (the length before application of tension). (Stated differently, herein, elongation strain of the optical cable 1 is referred to as cable elongation.) The vertical axis in the graph indicates tensile stress on a member (unit: $N/mm^2$).

In cases where members (e.g., the tension members 2 and/or the optical fibers 5) are housed inside the optical cable 1 in a twisted state, when cable elongation occurs due to application of tension to the optical cable 1, the members will deform so as to approach a straight form along the cable length direction. For example, in cases where the members are twisted in an S-Z configuration, when the members are untwisted, the members will deform so as to approach a straight form along the cable length direction. Also in cases where the members are twisted spirally in one direction, the members will deform so as to approach a straight form along the cable length direction such that the mutually twisted members tighten. Herein, "elongation of the members along the cable length direction due to the members deforming so as to approach a straight form along the cable length direction" may be referred to as "initial elongation". Further, as illustrated in FIG. 2, a "range of cable elongation of the optical cable 1 wherein the member (e.g., the tension member 2 or the optical fiber 5) undergoes initial elongation" may be referred to as "initial elongation region".

In cases where further cable elongation occurs beyond the initial elongation region, the member (e.g., the tension member 2 or the optical fiber 5) deforms so as to elongate in the cable length direction due to elastic deformation of the member. Herein, in cases where further cable elongation occurs beyond the initial elongation region, "elastic deformation of the member (e.g., the tension member 2 or the optical fiber 5) in the cable length direction corresponding to the elastic modulus of the member" may be referred to as "elastic elongation". Further, in cases where further cable elongation occurs beyond the initial elongation region, a "range of cable elongation of the optical cable 1 wherein the member (e.g., the tension member 2 or the optical fiber 5) undergoes elastic elongation (which corresponds to the elastic modulus of the member)" may be referred to as "elastic region". The slope of the graph in the elastic region corresponds to the elastic modulus of the member.

Further, in the following description, "cable elongation of the optical cable 1 corresponding to the boundary between the initial elongation region and the elastic region" may be referred to as "boundary elongation". FIG. 2 indicates that the boundary elongation is X1(%). Therefore, the initial elongation region is the range wherein the cable elongation of the optical cable 1 is from 0 to X1(%). Further, the elastic region is the range wherein the cable elongation of the optical cable 1 is X1(%) or greater.

Note that an "initial elongation" of a given member corresponds to the member's structural room for elongation (slack) in the length direction. In cases where a given member is twisted in an S-Z configuration, the initial elongation of that member (i.e., the member's structural room for elongation in the length direction) corresponds to the member's excessive length rate X (unit: %). Stated differently, in cases where a given member is twisted in an S-Z configuration, the member's boundary elongation X1 (unit: %) corresponds to the member's excessive length rate X (unit: %). Herein, "excessive length" refers to the difference between the length of a member housed inside the optical cable 1 (the member's dimension in the length direction) and the length of the optical cable 1 (the optical cable 1's dimension in the cable length direction). (Alternatively, "excessive length" means that the length of the member housed inside the optical cable 1 is longer than the length of the optical cable 1) "Excessive length rate" refers to the rate of the member's excessive length to the length of the optical cable 1. For example, when L1 (unit: mm) is the length of a member (tension member 2 or optical fiber 5) taken out from an optical cable 1 that has been cut to a predetermined length L0 (unit: mm), the member's excessive length is L1−L0, and the excessive length rate X (unit: %) is $X=100\times(L1-L0)/L0$. Note that, in cases where a member is twisted spirally in one direction, the member's initial elongation (the member's structural room for elongation in the length direction) corresponds to the room for elongation for when the loosely-twisted member tightens and thereby elongates in the length direction. Therefore, in cases where the member is twisted spirally in one direction, the member's boundary elongation X1 is shorter than the member's excessive length rate X. Note that, even in cases where a member is not twisted, it is possible to provide the member with structural room for elongation (slack) in the length direction. For example, by disposing the member in a meandering manner, it is possible to provide the member with structural room for elongation (slack) in the length direction, even if the member is not twisted.

Herein, the elastic region is a range wherein the cable elongation is from X1 to X1+Xe. Xe corresponds to the elongation (herein, elongation strain) of a member (e.g., the tension member 2 or the optical fiber 5) in which the member is elastically deformable. Note that, when the cable elongation is X1(%), the elongation of the member (e.g., the tension member 2 or the optical fiber 5) is 0(%), and the member will elastically deform within a range that the member's elongation (herein, elongation strain) is from 0 to Xe (%).

In cases where further cable elongation occurs beyond the elastic region, the member (e.g., the tension member 2) will be subjected to plastic deformation, and after that, the member will break. FIG. 2 shows that X1+Xu (%) is the cable elongation when member breaks. Xu corresponds to the member's elongation (herein, elongation strain) at break of the member.

In the following description, in cases where the member is a tension member 2, the values corresponding to X1, Xe, and Xu in FIG. 2 may be indicated as X1_t, Xe_t, and Xu_t. In cases where the member is an optical fiber 5, the values corresponding to X1, Xe, and Xu in FIG. 2 may be indicated as X1_f, Xe_f, and Xu_f. (In the following description, in cases where the member is a tension member 2, the subscript "t" is attached, and in cases where the member is an optical fiber 5, the subscript "f" is attached)

{Twisting of Tension Members}

FIG. 3A is a conceptual diagram showing relationships between cable elongation of the optical cable 1 according to one or more embodiments and stress on various members. FIG. 3B is a conceptual diagram showing relationships between cable elongation of an optical cable 1 according to a comparative example and stress on various members. The horizontal axis in the graph indicates the cable elongation (unit: %; elongation strain) of the optical cable 1. The vertical axis in the graph indicates tensile stress on each member (unit: $N/mm^2$). The bold line in the figure shows a graph for the tension member 2. The thin line in the figure shows a graph for the optical fiber 5.

FIG. 4A is a conceptual diagram showing a relationship between cable elongation of the optical cable 1 according to one or more embodiments and tension applied to the optical cable 1. FIG. 4B is a conceptual diagram showing a relationship between cable elongation of the optical cable 1 according to the comparative example and tension applied to the optical cable 1. The horizontal axis in the graph indicates the cable elongation (unit: %) of the optical cable 1. The vertical axis in the graph indicates tension (unit: N) applied to the optical cable 1. The tension Ta in the graph indicates the allowable tension of the optical cable 1.

Tension applied to the optical cable 1 is not borne only by the tension members 2 and the optical fibers 5, but is also borne by other members, such as the outer sheath 8. However, for the sake of brevity of explanation, tension applied to the optical cable 1 is considered as being borne by the tension members 2 and the optical fibers 5, and tension borne by the outer sheath 8 is disregarded. Note that, since the product (=E×S) between the modulus of longitudinal elasticity E (Young's modulus) and the cross-sectional area S is larger for the tension members 2 and the optical fibers 5 than other members such as the outer sheath 8, it is possible to make an approximation that the tension applied to the optical cable 1 is borne by the tension members 2 and the optical fibers 5. Particularly, in cases where the optical cable 1 is an ultra-high-fiber-count cable having several thousands of optical fibers 5, it is possible to make an approximation that the tension applied to the optical cable 1 is borne by the tension members 2 and the optical fibers 5.

For example, the modulus of longitudinal elasticity of the tension member 2 is approximately 42.1 GPa, and the modulus of longitudinal elasticity of the optical fiber 5 is approximately 72.0 GPa, whereas the modulus of longitudinal elasticity of the outer sheath 8 is approximately 0.98 GPa. Further, for example, in cases where the optical cable 1 illustrated in FIG. 1 is an ultra-high-fiber-count cable including 1728 pieces of optical fibers 5, the cross-sectional area of the tension members 2 (the total cross-sectional area of the plurality of tension members 2) is approximately 0.4 $mm^2$, and the total cross-sectional area of the optical fibers 5 is approximately 21.2 $mm^2$, whereas the cross-sectional area of the outer sheath 8 is approximately 49.5 $mm^2$. Thus, the product between the respective modulus of longitudinal elasticity E and the cross-sectional area S for the tension members 2, the optical fibers 5, and the outer sheath 8 is approximately 16.8 kN, approximately 1526 kN, and approximately 53.9 kN, respectively.

Note that, in one or more embodiments, the tension members 2 are disposed in a twisted state in an S-Z configuration, whereas in the comparative example, the tension members 2 are disposed in a straight form along the cable length direction.

Case with No Structural Room for Elongation (Slack) in Length Direction (Comparative Example):

In the comparative example, the tension members 2 are disposed in a straight form along the cable length direction, and hence, the tension members 2 of the comparative example have no initial elongation region. Therefore, as illustrated in FIG. 3B, from the start of occurrence of cable elongation of the optical cable 1 due to application of tension to the optical cable 1, tension is applied to the tension members 2 (the tension members 2 bear the tension), and the tension members 2 undergo elongating deformation. In this example, the tension members 2 undergo elastic deformation within a range (elastic region of the tension members 2) wherein the cable elongation (unit: %; elongation strain) of the optical cable 1 (or the tension members 2) is from 0 to Xe_t. Note that, when the cable elongation of the optical cable 1 (or the tension members 2) exceeds Xe_t, the tension members 2 will undergo plastic deformation, and after that, the tension members 2 will break. In this example, the elongation strain of the tension members 2 when the tension members 2 break (fracture point) is indicated as Xu_t (unit: %).

Since the optical fibers 5 are twisted in an S-z configuration, when the optical cable 1 starts to undergo cable elongation by application of tension to the optical cable 1, the optical fibers 5 simply get untwisted, and almost no tension is applied to the optical fibers 5. (At this stage, almost no elongation strain occurs in the optical fibers 5.) Therefore, as illustrated in FIG. 3B, within a range (initial elongation region of the optical fibers 5) wherein the cable elongation (unit: %) of the optical cable 1 is from 0 (zero) to X1_f, almost no tension is applied to the optical fibers 5.

As illustrated in FIG. 3B, in case of the optical cable 1 of the comparative example, there is a large difference between the cable elongation (substantially 0%) of the optical cable 1 when tension starts to be applied to the tension members 2 and the cable elongation (X1_f) of the optical cable 1 when tension starts to be applied to the optical cable 1. Therefore, in case of the optical cable 1 of the comparative example, when tension within a range of allowable tension Ta, as shown in FIG. 4B, is applied to the optical cable 1, the tension on the optical cable 1 cannot be dispersed to the optical fibers 5, and the tension members 2 will mainly bear the tension of the optical cable 1. So, in case of the comparative example, in order that tension within the range of allowable tension Ta can be borne within the elastic region of the tension members 2 (or, in order that tension within the range of allowable tension Ta can be borne by the tension members 2 without breaking), the tension members 2 need to be made thick, which, in turn, will make the optical cable 1 thick.

Case Having Structural Room for Elongation (Slack) in Length Direction:

In cases where the tension members 2 are twisted in an S-Z configuration and the tension members 2 have structural room for elongation in the length direction, the tension members 2 simply get untwisted when the optical cable 1 starts to undergo cable elongation by application of tension to the optical cable 1, and almost no tension is applied to the tension members 2. (At this stage, almost no elongation strain occurs in the tension members 2.) Therefore, as illustrated in FIG. 3A, within a range (initial elongation region of the tension members 2) wherein the cable elongation of the optical cable 1 is from 0 (zero) to X1_t, almost no tension is applied to the tension members 2.

As untwisting of the tension members 2 proceeds, the tension members 2 approach a straight form along the cable length direction. When the cable elongation (unit: %) of the optical cable 1 reaches the boundary elongation X1_t of the tension members 2, untwisting of the tension members 2 is completed, and the tension members 2 assume a substantially straight form inside the optical cable 1.

In cases where further cable elongation occurs in the optical cable 1 beyond the state where the cable elongation of the optical cable 1 has reached the boundary elongation X1_t of the tension members 2 (the state in which untwisting of the tension members 2 has completed; the state in which the tension members 2 assume a straight form), tension starts to be applied to the tension members 2 from this stage (i.e., the tension members 2 bear the tension), and the tension members 2 undergo elongating deformation. In this example, the tension members 2 undergo elastic deformation within a range (elastic region of the tension members 2) wherein the cable elongation of the optical cable 1 is from X1_t to X1_t+Xe_t. Note that, when the cable elongation of the optical cable 1 exceeds X1_t+Xe_t, the tension members 2 will undergo plastic deformation. Further, when the cable elongation of the optical cable 1 exceeds X1_t+Xu_t, the tension members 2 will break.

The graph for the optical fibers 5 shown in FIG. 3A is the same as the graph for the optical fibers 5 of the comparative example shown in FIG. 3B. Since the optical fibers 5 are twisted in an S-Z configuration, when the optical cable 1 starts to undergo cable elongation, the optical fibers 5 simply get untwisted, and almost no tension is applied to the optical fibers 5. (At this stage, almost no elongation strain occurs in the optical fibers 5.) Therefore, as illustrated in FIG. 3A, within a range (initial elongation region of the optical fibers 5) wherein the cable elongation of the optical cable 1 is from 0 to X1_f, almost no tension is applied to the optical fibers 5.

As untwisting of the optical fibers 5 proceeds, the optical fibers 5 approach a straight form along the cable length direction. In this example, when the cable elongation of the optical cable 1 reaches the boundary elongation X1 f of the optical fibers 5, untwisting of the optical fibers 5 is completed, and the optical fibers 5 assume a substantially straight form inside the optical cable 1. Note that the cable elongation X1 f of the optical cable 1 (the boundary elongation of the optical fibers 5) when untwisting of the optical fibers 5 is completed is greater than the cable elongation X1_t of the optical cable 1 (the boundary elongation of the tension members 2) when untwisting of the tension members 2 is completed (X1_f>X1_t).

In cases where further cable elongation occurs in the optical cable 1 beyond the state where the cable elongation of the optical cable 1 has reached the boundary elongation X1 f of the optical fibers 5 (the state in which untwisting of the optical fibers 5 has completed; the state in which the optical fibers 5 assume a straight form), tension starts to be applied to the optical fibers 5 from this stage (i.e., the optical fibers 5 bear the tension), and the optical fibers 5 undergo elongating deformation. Note that, when the cable elongation of the optical cable 1 becomes even greater, the optical fibers 5 will break.

As illustrated in FIG. 3A, in case where the tension members 2 are twisted, there is a small difference between the cable elongation X1_t of the optical cable 1 (boundary elongation of the tension members 2; corresponding to the excessive length rate of the tension members 2) when tension starts to be applied to the tension members 2 and the cable elongation X1_f of the optical cable 1 (boundary elongation of the optical fibers 5; corresponding to the excessive length rate of the optical fibers 5) when tension starts to be applied to the optical cable 1. Therefore, in case where the tension members 2 are twisted, when tension within a range of allowable tension Ta, as shown in FIG. 4A, is applied to the optical cable 1, the tension on the optical cable 1 can easily be dispersed to the optical fibers 5. In this example, when tension Tf shown in FIG. 4A is applied to the optical cable 1, the cable elongation of the optical cable 1 reaches X1_f (see FIG. 3A). Therefore, when tension within a range from Tf to Ta is applied to the optical cable 1, the tension will be dispersed to both the tension members 2 and the optical fibers 5. Since tension amounting to allowable tension Ta can be dispersed to and be borne by both the tension members 2 and the optical fibers 5, the diameter of the tension members 2 can be reduced compared to the comparative example, and thus, the diameter of the optical cable 1 can be reduced.

In the description above, tension is dispersed to the optical fibers 5, but the tension may be dispersed to members other than the optical fibers 5. For example, tension applied to the optical cable 1 may be dispersed to members other than the tension members 2, such as the bundling member 6, the outer sheath 8, rip cords (not illustrated in FIG. 1), intervening members (not illustrated in FIG. 1), etc. Disposing the tension members 2 in a twisted state can achieve a structure in which tension on the optical cable 1 can be easily dispersed to such members. Note, however, that since optical fibers 5, which are made of glass, have a high modulus of longitudinal elasticity, it is advantageous to disperse the tension to the optical fibers 5. Particularly, in cases where the optical cable 1 includes a multitude of optical fibers 5 (for example, in cases where the optical cable 1 is an ultra-high-fiber-count cable having several thousands of optical fibers 5), the optical fibers 5, as a whole, can tolerate high tension, and thus, it is particularly advantageous to disperse the tension to the optical fibers 5.

As described above, the optical cable 1 of one or more embodiments includes tension members 2, a plurality of optical fibers 5, and an outer sheath 8. The tension members 2 are twisted and housed in the outer sheath 8 such that the boundary elongation X1_t of the tension members 2 is smaller than the boundary elongation X1_f of the optical fibers 5 (X1_t<X1_f). With this configuration, tension applied to the optical cable 1 can be easily dispersed to members other than the tension members 2. As a result, the diameter of the tension members 2 can be reduced, and thus, the diameter of the optical cable 1 can be reduced.

In the description above, the tension members 2 are twisted in an S-Z configuration, but the tension members 2 may be twisted spirally in one direction. Also in cases where the tension members 2 are twisted spirally in one direction, when tension is applied to the tension members 2, the mutually twisted tension members tighten and thereby elongate in the cable length direction, and as a result, tension applied to the optical cable 1 can be easily dispersed also to members other than the tension members 2. Note, however, that in cases where the tension members 2 are twisted in an S-Z configuration, the tension members 2 assume a straight form as a result of untwisting of the tension members 2, and therefore, the tension members 2 can easily elongate in the cable length direction compared to cases where the tension members 2 are twisted spirally in one direction. Stated differently, in cases where the tension members 2 are twisted in an S-Z configuration, the value of the boundary elongation $X1\_t$ of the tension members 2 is greater than in cases where the tension members 2 are twisted spirally in one direction, and therefore, tension applied to the optical cable 1 can be easily dispersed also to members other than the tension members 2. Therefore, it is preferable that the tension members 2 are twisted in an S-Z configuration.

As illustrated in FIG. 3A, it is preferable that the tension members 2 are not broken when the cable elongation of the optical cable 1 is at the boundary elongation X1 f of the optical fiber 5. To achieve this configuration, it is preferable that, as illustrated in FIG. 3A, X1 f is within a range from $X1\_t$ to $X1\_t+Xu\_t$ ($X1\_t \leq X1\_f \leq X1\_t+Xu\_t$), where $X1\_t$ (unit: %) is the boundary elongation of the tension member 2, $X1\_f$ (unit: %) is the boundary elongation of the optical fiber, and $Xu_t$ (%) is the elongation strain (unit: %) of the tension member 2 at break of the tension member 2. Stated differently, it is preferable that the elongation strain $Xu_t$ (unit: %) at break of the tension member 2 is greater than the difference between $X1\_f$ and $X1\_t$ ($Xu\_t \geq X1\_f-X1\_t$). In cases where the optical cable 1 houses such tension members 2 and optical fibers 5 satisfying the aforementioned conditions, breakage of the tension members 2 can be inhibited. Note that, in cases where the members are twisted in an S-Z configuration, the boundary elongation X1 (unit: %) of the member corresponds to the excessive length rate X (unit: %) of the member, and therefore, it is preferable that the elongation strain $Xu_t$ (unit: %) at break of the tension member 2 is greater than the difference between the excessive length rate $X1\_f$ (unit: %) of the optical fiber 5 and the excessive length rate $X1\_t$ (unit: %) of the tension member 2.

Further, as illustrated in FIG. 3A, it is preferable that the tension members 2 are undergoing elastic deformation when the cable elongation of the optical cable 1 is at the boundary elongation $X1\_f$ of the optical fiber 5. In this way, plastic deformation of the tension members 2 can be inhibited. To achieve this configuration, it is preferable that the cable elongation corresponding to the boundary elongation X1 f of the optical fiber 5 is within the range of the elastic region of the tension member 2. That is, it is preferable that, when the elastic region of the tension member 2 is within a range from $X1\_t$ to $X1\_t+Xe\_t$, then $X1\_f$ is within a range from $X1\_t$ to $X1\_t+Xe\_t$ ($X1\_t \leq X1\_f \leq X1\_t+Xe\_t$). Stated differently, it is preferable that elongation strain $Xe_t$ (unit: %) by which the tension member 2 is elastically deformable is greater than the difference between $X1\_f$ and $X1\_t$ ($Xe\_t > X1\_f-X1\_t$). In cases where the optical cable 1 houses such tension members 2 and optical fibers 5 satisfying the aforementioned conditions, plastic deformation of the tension members 2 can be inhibited. Note that, in cases where the members are twisted in an S-Z configuration, the boundary elongation X1 (unit: %) of the member corresponds to the excessive length rate X (unit: %) of the member, and therefore, it is preferable that the elongation strain $Xe_t$ (unit: %) by which the tension member 2 is elastically deformable is greater than the difference between the excessive length rate $X1\_f$ (unit: %) of the optical fiber 5 and the excessive length rate $X1\_t$ (unit: %) of the tension member 2.

In a structure where the tension members 2 are disposed in a central part of the optical cable 1 and the plurality of optical fibers 5 are twisted around the outer periphery of the tension members 2 as illustrated in FIG. 1, the difference between $X1\_t$ and $X1\_f$ tends to become large (and as a result, when the cable elongation of the optical cable 1 reaches $X1\_f$, the tension members 2 may undergo plastic deformation or may break). So, in such a structure, it is advantageous that the tension members 2 in a twisted state are disposed also in a meandering manner. By meanderingly disposing the mutually twisted tension members 2, the difference between $X1\_t$ and $X1\_f$ can be made small easily (and as a result, tension on the optical cable can be easily dispersed to members other than the tension members 2, and thereby, the structure will be able to easily inhibit plastic deformation of the tension members 2). Therefore, in cases where the tension members 2 are disposed in a central part of the optical cable 1 and the plurality of optical fibers 5 are twisted around the outer periphery of the tension members 2 as illustrated in FIG. 1, it is advantageous that the tension members 2 in a twisted state are disposed meanderingly.

Note that it is preferable that, when an allowable tension Ta is applied to the optical cable 1 and thereby tension is applied to the optical fiber 5, the elongation strain of the optical fiber 5 is 60% or less of a proof level (screening level at the time of proof testing) pursuant, for example, to ICEA-S-87-640. For example, in cases of using an optical fiber having a proof level of 1.5%, it is preferable that, when an allowable tension Ta is applied to the optical cable 1, the elongation strain of the optical fiber 5 is 0.9% or less, or may be 0.3% or less in cases where higher reliability is required.

{Method for Manufacturing Optical Cable}

Figure 5:
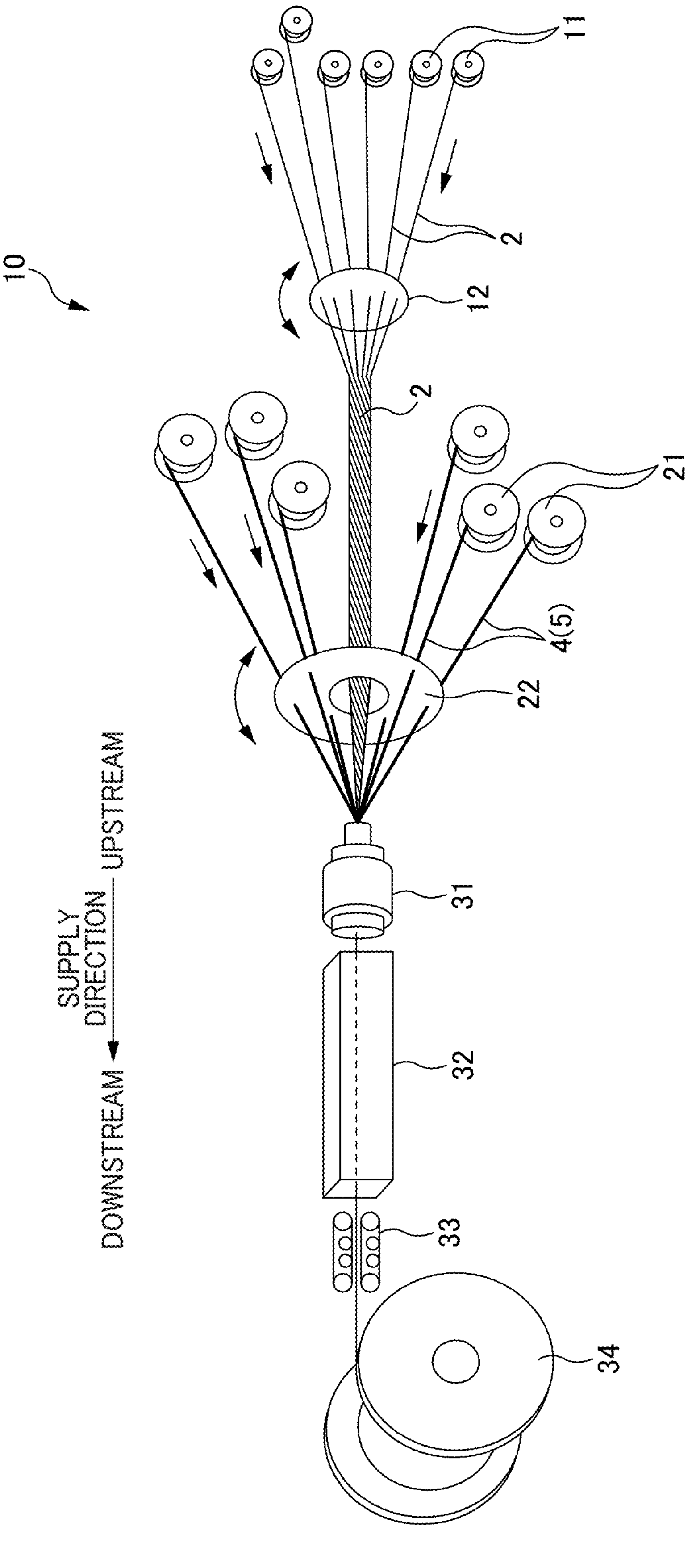
FIG. 5 is an explanatory diagram of a system for manufacturing an optical cable according to one or more embodiments.

FIG. 5 is an explanatory diagram of a system for manufacturing an optical cable 1. The manufacturing system includes first suppliers 11, a first guide disk 12, second suppliers 21, a second guide disk 22, an extruder 31, a cooler 32, a take-up part 33, and a drum 34.

The first supplier 11 is a supply source configured to supply a tension member 2. The plurality of first suppliers 11 respectively supply tension members 2 to the first guide disk 12.

The first guide disk 12 is a plate-shaped member for twisting the tension members 2. The first guide disk 12 has a plurality of insertion holes. The insertion holes are through holes penetrating the first guide disk 12, and are holes through which the tension members 2 are respectively passed. The tension members 2 are supplied from the first suppliers 11 respectively towards the insertion holes in the first guide disk 12. In a state where the tension members 2 are respectively passed through the insertion holes, the first guide disk 12 rotates back and forth about a central rotation axis. By the back-and-forth rotation of the first guide disk 12, the plurality of tension members 2 are twisted together in an S-Z configuration. The tension members 2, which are in an S-Z twisted state, are then supplied to the second guide disk 22.

The second supplier 21 is a supply source configured to supply optical fibers 5. In this example, the second supplier 21 is constituted by a drum around which an optical fiber unit 4 is wound. Note that, instead of supplying an optical fiber unit 4 (a member in which a plurality of optical fibers 5 are bundled by a bundling member 6), the second supplier 21 may supply a plurality of optical fibers 5 (e.g., an intermittently-connected optical fiber ribbon) which are not bundled by a bundling member 6. Further, instead of a drum, the second supplier 21 may be constituted by a device for manufacturing an optical fiber unit 4 (or an optical fiber ribbon). The plurality of second suppliers 21 respectively supply optical fibers 5 (in this example, optical fiber units 4) to the second guide disk 22.

The second guide disk 22 is a plate-shaped member for twisting the optical fibers 5. The second guide disk 22 has a first insertion hole and a plurality of second insertion holes. The first and second insertion holes are through holes penetrating the second guide disk 22. The first insertion hole is provided in a central part of the second guide disk 22, and is a hole through which the tension members 2 are passed. The tension members 2, in a twisted state, are supplied from the first guide disk 12 towards the first insertion hole. The second insertion holes are holes through which the optical fibers 5 are passed, and the plurality of second insertion holes are disposed so as to surround the first insertion hole. The optical fibers 5 (in this example, the optical fiber units 4) are supplied from the second suppliers 21 respectively towards the second insertion holes.

In a state where the tension members 2, in a twisted state, are passed through the first insertion hole and the optical fibers 5 (in this example, the optical fiber units 4) are respectively passed through the second insertion holes, the second guide disk 22 rotates back and forth about a central rotation axis. By the back-and-forth rotation of the second guide disk 22, the plurality of optical fibers 5 are twisted together in an S-Z configuration around the outer periphery of the tension members 2. Note that the timing for reversing the back-and-forth rotation of the second guide disk 22 may be synchronized with the timing for reversing the back-and-forth rotation of the first guide disk 12, so that the twisting direction of the optical fibers 5 is opposite from the twisting direction of the tension members 2. The tension members 2, which are in an S-Z twisted state, and the optical fibers 5, which are in an S-Z twisted state on the outside of the tension members 2, are supplied to the extruder 31.

In FIG. 5, the second guide disk 22 is located downstream of the first guide disk 12 in the supply direction. Note, however, that the position of the second guide disk 22 in the supply direction may be the same as that of the first guide disk 12. In this case, the first guide disk 12 will be located inside the first insertion hole of the second guide disk 22, and the first guide disk 12 and the second guide disk 22 will be rotated back and forth independent of each other. Further, in this case, in order to make the twisting direction of the optical fibers 5 opposite from the twisting direction of the tension members 2, the first guide disk 12 and the second guide disk 22 may be rotated back and forth in synchronization so that the second guide disk 22 rotates in the opposite direction from the first guide disk 12. In cases where the first guide disk 12 and the second guide disk 22 are located at the same position in the supply direction, a power transmission mechanism may be disposed between the first guide disk 12 and the second guide disk 22 so that the first guide disk 12 and the second guide disk 22 rotate back and forth in synchronization.

The extruder 31 is a device for forming an outer sheath 8. The extruder 31 is where the tension members 2, in a twisted state, and the plurality of optical fibers 5 (optical fiber units 4), in a twisted state and disposed around the outer periphery of the tension members 2, are supplied. The extruder 31 is also where other members, such as the wrapping tape 7 (not illustrated in FIG. 5; see FIG. 1), etc., are supplied. Note that a predetermined tension is applied in advance respectively to the tension members 2 and the optical fibers 5 passing through the extruder 31. In the extruder 31, the wrapping tape 7 is wrapped so as to surround the outer periphery of the plurality of optical fibers 5, and then resin, which becomes the outer sheath 8, is extruded thereon, to manufacture the optical cable 1 illustrated in FIG. 1.

The cooler 32 is a device for cooling the optical cable 1. The cooler 32 is located downstream of the extruder 31 in the supply direction, and is configured to cool the optical cable 1 molded in the extruder 31. Note that the take-up part 33 is located downstream of the cooler 32 in the supply direction.

The take-up part 33 is a device for taking-up the cooled optical cable 1. The optical cable 1 taken-up by the take-up part 33 is wound up on the drum 34. On the upstream side of the take-up part 33 in the supply direction, a predetermined tension is applied to the tension members 2 and the optical fibers 5. On the other hand, on the downstream side of the take-up part 33 in the supply direction, the tension applied to the tension members 2 and the optical fibers 5 is released.

Note that, when the tension applied to the tension members 2 and the optical fibers 5 is released on the downstream side of the take-up part 33 in the supply direction and also the outer sheath 8 is cooled and thus shrinks in the cable length direction, the tension members 2 and the optical fibers 5 will be housed inside the outer sheath 8 with a predetermined excessive length. Stated differently, a predetermined tension (i.e., a tension which takes into account, in advance, the shrinkage amount of the outer sheath 8 after cooling) is applied to the tension members 2 and the optical fibers 5 so that the tension members 2 and the optical fibers 5 are housed inside the outer sheath 8 with a predetermined excessive length. In this way, the tension members 2, in a twisted state, can be housed inside the outer sheath 8 in a manner that the boundary elongation $X1\_t$ of the tension member 2 becomes smaller than the boundary elongation $X1\_f$ of the optical fiber 5 ($X1\_t<X1\_f$). Note that the mutually twisted tension members 2 may be caused to meander by utilizing the shrinkage, in the cable length direction, of the outer sheath 8 after being extrusion molded.

The drum 34 is a member around which the optical cable 1 is wound. Note that, since the optical fibers 5 are twisted in an S-Z configuration, it is possible to suppress reduction of transmission loss of specific optical fibers 5, even in a state where the optical cable 1 is wound around the drum 34.

Modified Examples

FIGS. 6A to 6D are cross-sectional views of optical cables 1 according to first to fourth modified examples. In FIGS. 6A to 6D, the same members as those described above are accompanied by the same reference signs, and explanation of those members may be omitted.

Similar to the optical cable 1 illustrated in FIG. 1, each of the optical cables 1 illustrated in FIGS. 6A to 6D includes tension members 2, a plurality of optical fibers 5, and an outer sheath 8. Also, in each of the optical cables 1 illustrated in FIGS. 6A to 6D, the tension members 2 are housed in a twisted state inside the outer sheath 8 in a manner that the boundary elongation X1_t of the tension member 2 is smaller than the boundary elongation X1_f of the optical fiber 5 (X1_t<X1_f). Thus, the optical cables 1 according to the first to fourth modified examples have a structure wherein tension applied to the optical cable 1 can be easily dispersed to members other than the tension members 2, and thus, the diameter of the optical cable 1 can be reduced.

Figure 6A:
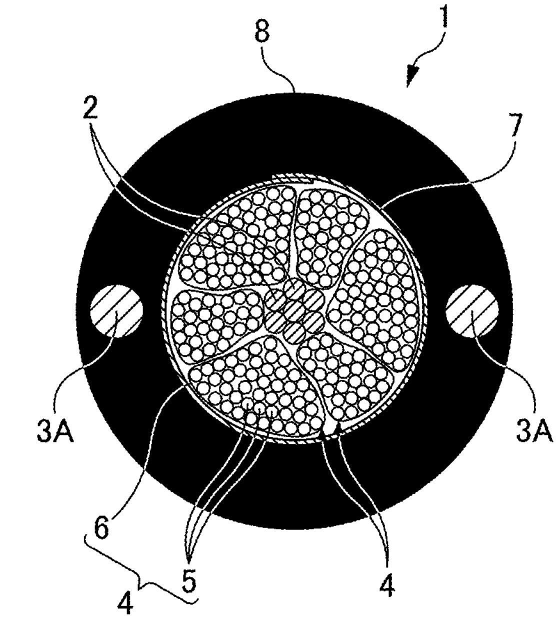
FIG. 6A is a cross-sectional view of an optical cable according to a first modified example.
Figure 6B:
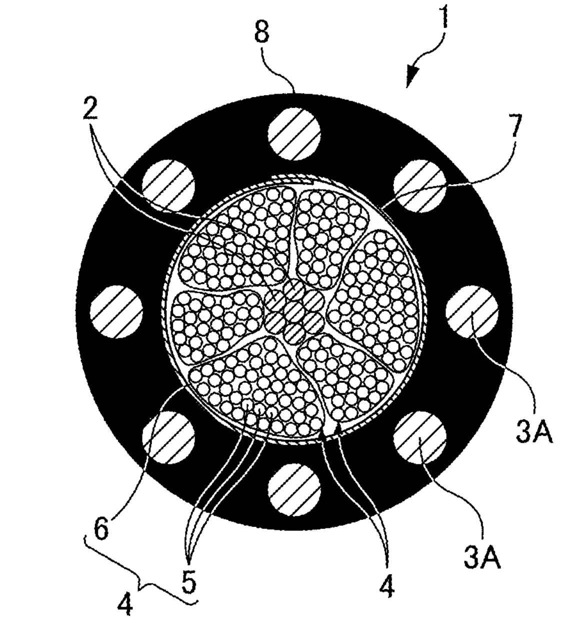
FIG. 6B is a cross-sectional view of an optical cable according to a second modified example.
Figure 6C:
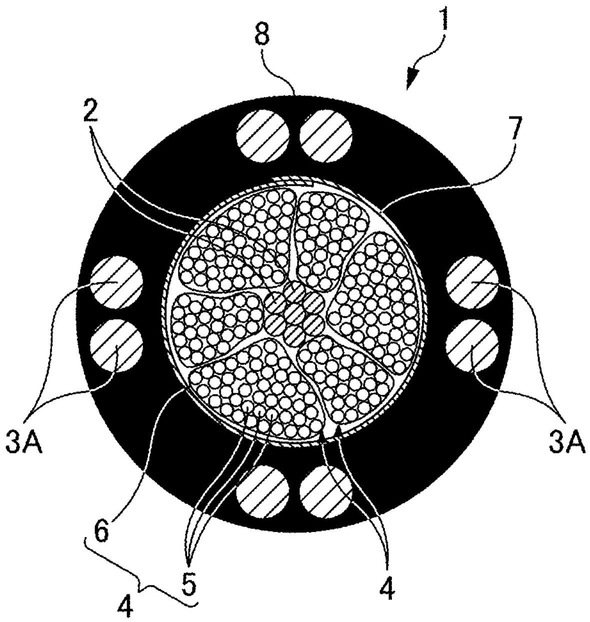
FIG. 6C is a cross-sectional view of an optical cable according to a third modified example.

The optical cables 1 of the first to third modified examples illustrated in FIGS. 6A to 6C further include other tension members 3A embedded in the outer sheath 8. Also in the first to third modified examples, since the optical fibers 5 and the tension members 2 in the central part of the optical cable 1 can bear tension, the diameter of the tension members 3A to be embedded in the outer sheath 8 can be reduced, compared to cases where only the tension members 3A embedded in the outer sheath 8 bear the tension on the optical cable 1. Thus, also according to the first to third modified examples, the diameter of the optical cable 1 can be reduced.

Note that, when Xu_t' is defined as the cable elongation at the time the tension member 3A embedded in the outer sheath 8 breaks, it is preferable that both the boundary elongation X1_t of the tension member 2 (tension member housed inside the outer sheath 8, the tension member in the central part) and the boundary elongation X1_f of the optical fiber 5 are smaller than the cable elongation Xu_t' at break of the tension member 3A (X1_t<Xu_t' and X1_f<Xu_t'). In this way, tension can be borne by the optical fibers 5 and the tension members 2 in the central part of the optical cable 1 before the tension members 3A break (i.e., before cable elongation proceeds to an extent that the tension members 3A break). Thus, the diameter of the tension members 3A embedded in the outer sheath 8 can be reduced compared to cases where tension on the optical cable 1 is borne only by the tension members 3A embedded in the outer sheath 8.

As in the first modified example illustrated in FIG. 6A, a pair of tension members 3A may be disposed so as to sandwich the housing space of the outer sheath 8. In cases where a pair of tension members 3A is disposed in this way, the optical cable 1 can be easily bent in a direction where the neutral plane is along a line connecting the respective centers of the tension members 3A, whereas the optical cable 1 is hard to bend in a direction orthogonal thereto. Therefore, compared to the optical cable 1 illustrated in FIG. 1, the optical cable 1 will have bending directivity. However, in the first modified example illustrated in FIG. 6A, since it is possible to reduce the diameter of the tension members 3A embedded in the outer sheath 8 as described above, bending directivity of the optical cable 1 can be suppressed, even when a pair of tension members 3A is disposed as illustrated in FIG. 6A.

In the second modified example illustrated in FIG. 6B, a plurality of tension members 3A are embedded in the outer sheath 8 so as to be disposed at regular intervals in the circumferential direction. By disposing a plurality of tension members 3A regularly in the circumferential direction in this way, it is possible to suppress bending directivity of the optical cable 1 compared to the first modified example illustrated in FIG. 6A.

In the third modified example illustrated in FIG. 6C, two tension members 3A constitute a set, and a plurality of sets of tension members 3A are embedded in the outer sheath 8 so as to be disposed at regular intervals in the circumferential direction. By disposing a plurality of sets of tension members 3A regularly in the circumferential direction in this way, it is possible to suppress bending directivity of the optical cable 1 compared to the first modified example illustrated in FIG. 6A.

Figure 6D:
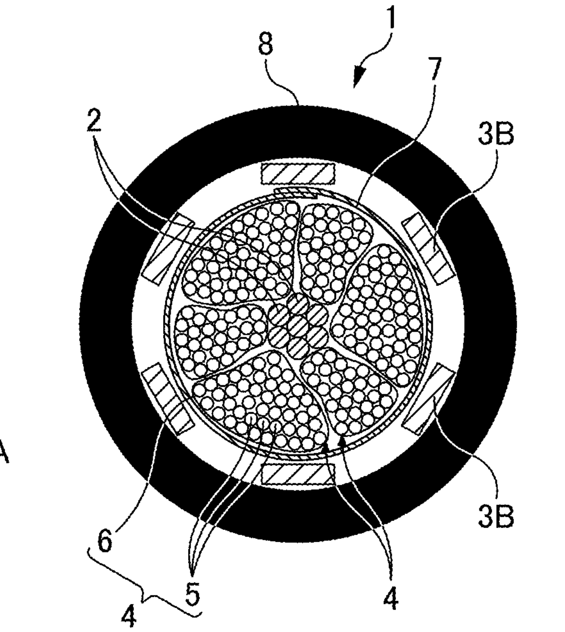
FIG. 6D is a cross-sectional view of an optical cable according to a fourth modified example.

The optical cable 1 of the fourth modified example illustrated in FIG. 6D further includes other tension members 3B disposed along the inner wall surface of the outer sheath 8. In this example, the tension members 3B are located between the outer sheath 8 and the wrapping tape 7. Note, however, that the tension members 3B may be located between the wrapping tape and the optical fiber units 4. As in the optical cable 1 illustrated in FIG. 1, also in the fourth modified example, tension can be borne by the optical fibers 5 and the tension members 2 in the central part of the optical cable 1, and therefore, the diameter (size) of the tension members 3B can be reduced. Thus, also in the fourth modified example, the diameter of the optical cable 1 can be reduced.

Note that, in contrast to the tension members 2 in the central part, the tension members 3B of the fourth modified example are laid lengthwise (i.e., are disposed in a straight form along the cable length direction). If the tension members 3B are twisted spirally in one direction, application of tension on the tension members 3B may cause the tension members 3B to be displaced toward the inside, which may cause the tension members 3B to compress the optical fibers 5. Therefore, it is preferable that the tension members 3B of the fourth modified example are not twisted.

In contrast, the tension members 3A of the first to third modified examples are embedded in the outer sheath 8, and therefore, are less likely to be displaced toward the inside even when tension is applied to the tension members 3A. Therefore, the tension members 3A of the first to third modified examples may be embedded in the outer sheath 8 in a twisted state. For example, the tension members 3A of the first to third modified examples may be twisted spirally in one direction and be embedded in the outer sheath 8 in this state, or may be twisted in an S-Z configuration by reversing the twisting directions and be embedded in the outer sheath 8 in this state. Alternatively, the tension members 3A of the first to third modified examples may be laid in a straight configuration along the cable length direction and be embedded in the outer sheath 8 in this state.

Second Example

Figure 7:
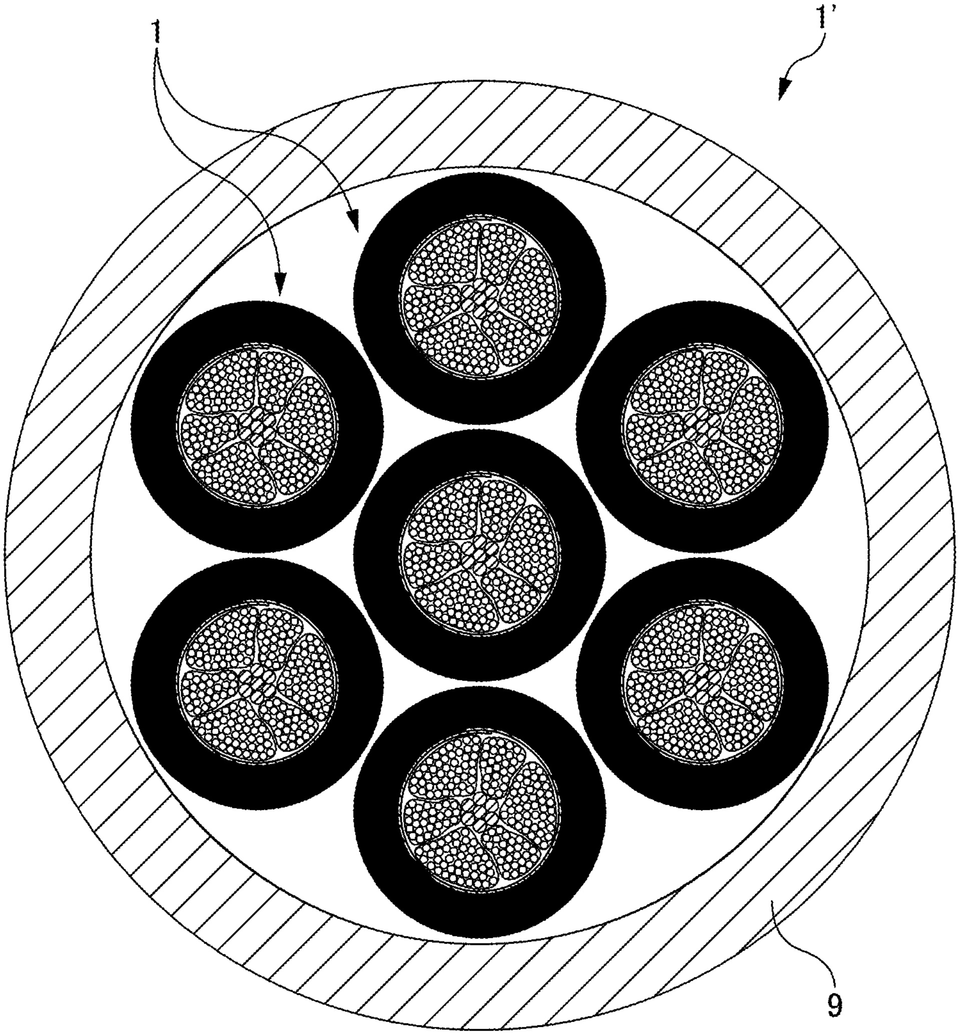
FIG. 7 is a cross-sectional view of an optical cable structure according to one or more embodiments.

FIG. 7 is a cross-sectional view of an optical cable structure 1'. The optical cable structure 1' includes a plurality of inner cables, and an exterior outer sheath 9 housing the plurality of inner cables.

The inner cable has the same configuration as the optical cable 1 illustrated in FIG. 1, and includes tension members 2, a plurality of optical fibers 5, and an outer sheath 8. The inner cable may have a different configuration from the optical cable 1 illustrated in FIG. 1, as long as the tension members 2 in the central part are twisted, and may be, for example, one of the optical cables 1 of the modified examples illustrated in FIGS. 6A to 6D. As in the optical cable 1 illustrated in FIG. 1, also in the inner cable, the optical fibers 5 and the tension members 2 in the central part can bear tension, and therefore, the diameter of the tension members 2 can be reduced, thereby enabling a reduction in diameter of the inner cable. Thus, by employing the optical cables 1 illustrated in FIG. 1 as the inner cables, the diameter of the optical cable structure 1' can be reduced.

Further, in the optical cable structure 1' illustrated in FIG. 7, the bending directivity of the inner cables is suppressed.

Therefore, the inner cables can be handled easily, thereby facilitating mid-span branching for taking out inner cable(s) from the optical cable structure 1'. Furthermore, since the bending directivity of the inner cables is suppressed, the plurality of inner cables can be housed inside the exterior outer sheath 9 in a twisted state.

Other Embodiments

The foregoing embodiments are for facilitating the understanding of the present invention, and are not to be construed as limiting the present invention. The present invention may be modified and/or improved without departing from the gist thereof, and it goes without saying that the present invention encompasses equivalents thereof. Further, the various embodiments described above may be employed in combination, as appropriate. Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, the optical cable may include, as appropriate, other members, such as a wrapping tape, a rip cord, a protection layer, etc. The cross-sectional shape of the optical cable is not limited to circular, and may be other shapes, such as rectangular, elliptic, etc. The features in the various embodiments may be employed in combination with other embodiments.

REFERENCE SIGNS LIST

1: Optical cable;
1': Optical cable structure;
2: Tension member;
3A, 3B: Other tension members;
4: Optical fiber unit;
5: Optical fiber;
6: Bundling member;
7: Wrapping tape;
8: Outer sheath;
9: Exterior outer sheath;
10: Manufacturing system;
11: First supplier;
12: First guide disk;
21: Second supplier;
22: Second guide disk;
31: Extruder;
32: Cooler;
33: Take-up part;
34: Drum.

The invention claimed is:

1. An optical cable comprising:
one or more tension members;
optical fibers disposed around an outer periphery of the one or more tension members; and
an outer sheath housing the one or more tension members and the optical fibers, wherein
two or more of the tension members are twisted,
one or more of the twisted tension members is disposed meanderingly,
a boundary elongation of the one or more tension members is smaller than a boundary elongation of the optical fibers,
the boundary elongation of the one or more tension members and the boundary elongation of the optical fibers is a cable elongation corresponding to a boundary between an initial elongation region and an elastic region,
in the one or more tension members:
the initial elongation region is a range of the cable elongation caused by tension generated from an initial elongation of the one or more tension members deforming to approach a straight form along a cable length direction, and
the elastic region is a range of the cable elongation when further cable elongation beyond the initial elongation region causes elastic elongation of the one or more tension members corresponding to an elastic modulus of the one or more tension members, and
in the optical fibers:
the initial elongation region is a range of the cable elongation caused by tension generated from an initial elongation of the optical fibers deforming to approach a straight form along the cable length direction, and
the elastic region is a range of the cable elongation when further cable elongation beyond the initial elongation region causes elastic elongation of the optical fibers corresponding to an elastic modulus of the optical fibers.

2. The optical cable according to claim 1, wherein the optical cable comprises two or more of the tension members twisted in an S-Z configuration.

3. The optical cable according to claim 2, wherein
the optical fibers are twisted in an S-Z configuration, and
a twisting direction of the tension members is opposite to a twisting direction of the optical fibers.

4. The optical cable according to claim 1, wherein the one tension member includes tensile fibers.

5. The optical cable according to claim 1, wherein X1_f is within from X1_t to X1_t+Xu_t, inclusive where
X1_t (%) is the boundary elongation of the one or more tension members,
X1_f (%) is the boundary elongation of the optical fibers, and
Xu_t (%) is an elongation strain of the one or more tension members at break of the one or more tension members.

6. The optical cable according to claim 5, wherein X1_f is within from X1_t to X1_t+Xe_t, inclusive where
Xe_t (%) is an elongation strain by which the one or more tension members are elastically deformed.

7. The optical cable according to claim 1, wherein an elongation strain of the optical fibers is equal to or less than 60% of a proof level when an allowable tension is applied to the optical cable and thereby tension is applied to the optical fibers.

8. The optical cable according to claim 1, wherein the optical cable comprises two or more of the tension members, one of which is embedded in the outer sheath.

9. An optical cable structure comprising:
optical cables as inner cables, wherein each of the optical cables is the optical cable according to claim 1.

10. An optical cable manufacturing method, comprising:
supplying one or more tension members;
twisting two or more of the tension members together,
disposing optical fibers around an outer periphery of the one or more tension members;
forming an outer sheath such that the outer sheath houses the one or more tension members and the optical fibers, and meandering the twisted tension members due to the outer sheath shrinking in a cable length direction after being extrusion molded, wherein a boundary elongation of the one or more tension members is smaller than a boundary elongation of the optical fibers, the boundary elongation of the one or more tension members and the boundary elongation of the optical fibers is a cable elongation corresponding to a boundary between an initial elongation region and an elastic region, in the one or more tension members:

the initial elongation region is a range of the cable elongation caused by tension generated from an initial elongation of the one or more tension members deforming to approach a straight form along the cable length direction, and the elastic region is a range of the cable elongation when further cable elongation beyond the initial elongation region causes elastic elongation of the one or more tension members corresponding to an elastic modulus of the one or more tension members, and in the optical fibers:

the initial elongation region is a range of the cable elongation caused by tension generated from an initial elongation of the optical fibers deforming to approach a straight form along the cable length direction, and the elastic region is a range of the cable elongation when further cable elongation beyond the initial elongation region causes elastic elongation of the optical fibers corresponding to an elastic modulus of the optical fibers.

* * * * *